(12) United States Patent
Barber et al.

(10) Patent No.: US 9,535,940 B2
(45) Date of Patent: *Jan. 3, 2017

(54) INTRA-BLOCK PARTITIONING FOR DATABASE MANAGEMENT

(75) Inventors: Ronald J. Barber, San Jose, CA (US); Min-Soo Kim, Daegu (KR); Sam S. Lightstone, Ontario (CA); Guy M. Lohman, San Jose, CA (US); Lin Qiao, San Jose, CA (US); Vijayshankar Raman, Sunnyvale, CA (US); Eugene J. Shekita, San Jose, CA (US); Richard S. Sidle, Mountain View, CA (US)

(73) Assignee: International Business Machines Corporation, Armonk, NY (US)

(*) Notice: Subject to any disclaimer, the term of this patent is extended or adjusted under 35 U.S.C. 154(b) by 252 days.

This patent is subject to a terminal disclaimer.

(21) Appl. No.: 13/599,007

(22) Filed: Aug. 30, 2012

(65) Prior Publication Data

US 2013/0325901 A1 Dec. 5, 2013

Related U.S. Application Data

(63) Continuation of application No. 13/485,707, filed on May 31, 2012.

(51) Int. Cl.
*G06F 17/30* (2006.01)

(52) U.S. Cl.
CPC ... *G06F 17/30315* (2013.01); *G06F 17/30584* (2013.01)

(58) Field of Classification Search
CPC .................... G06F 17/30864; G06F 17/30985; G06F 17/00; G06F 17/175; G06F 17/227;
(Continued)

(56) References Cited

U.S. PATENT DOCUMENTS 4,152,762 A * 5/1979 Bird .................. G06F 17/30985
365/189.07
6,216,125 B1 * 4/2001 Johnson
(Continued)

OTHER PUBLICATIONS

Stoimen; Computer Algorithms: Sequential Search; Nov. 24, 2011; pp. 1-5 http://www.stoimen.com/blog/2011/11/24/computer-algorithms-sequential-search/.*
(Continued)

*Primary Examiner* — Boris Gorney
*Assistant Examiner* — Amanda Willis
(74) *Attorney, Agent, or Firm* — Jeffrey T. Holman (57) ABSTRACT

A method for storing database information includes storing a table having data values in a column major order. The data values are stored in a list of blocks. The method also includes assigning a tuple sequence number (TSN) to each data value in each column of the table according to a sequence order in the table. The data values that correspond to each other across a plurality of columns of the table have equivalent TSNs. The method also includes assigning each data value to a partition based on a representation of the data value. The method also includes assigning a tuple map value to each data value. The tuple map value identifies the partition in which each data value is located.

5 Claims, 5 Drawing Sheets (58) Field of Classification Search
CPC .............. G06F 17/2735; G06F 17/276; G06F 17/30091; G06F 17/30144; G06F 17/30253; G06F 17/3033; G06F 17/30336; G06F 17/30339; G06F 17/30386; G06F 17/30501; G06F 17/30542; G06F 17/30563; G06F 17/30569; G06F 17/30589; G06F 17/30592; G06F 17/30598; G06F 17/30675; G06F 17/30705; G06F 17/30722; G06F 17/30737; G06F 17/30896; G06F 17/30961; G06F 17/50; G06F 17/5004; G06F 11/1048; G06F 11/263; G06F 11/368; G06F 11/1016; G06F 11/1076; G06F 11/108; G06F 11/1464; G06F 11/2058; G06F 11/3604; G06F 12/0246; G06F 12/0607; G06F 12/0623; G06F 12/1441; G06F 12/145; G06F 12/1466; G06F 3/0611; G06F 3/0685; G06F 3/048; G06F 3/0488; G06F 3/0608; G06F 3/0619; G06F 3/0635; G06F 3/0641; G06F 3/0644; G06F 3/0656; G06F 3/067; G06F 3/0683; G06F 3/167; G06F 21/31; G06F 21/316; G06F 21/32; G06F 21/34; G06F 21/35; G06F 21/40; G06F 21/45; G06F 21/55; G06F 21/552; G06F 21/554; G06F 21/56; G06F 21/562; G06F 21/563; G06F 21/564; G06F 21/60; G06F 13/28; G06F 8/71; G06F 8/65; G06F 1/02; G06F 2201/84; G06F 2211/1057; G06F 9/44505; G06F 9/54; G06F 2212/1052; G06F 2212/2532; G06F 2212/7208

USPC ......................................................... 707/792
See application file for complete search history.

(56) References Cited

U.S. PATENT DOCUMENTS 7,827,187 B2 * 11/2010 Raman et al. ................ 707/750
2005/0240943 A1 * 10/2005 Smith et al. ................... 719/328
2009/0060345 A1 3/2009 Wheeler et al.

OTHER PUBLICATIONS

Zandi et al. "Sort Order Preserving Data Compression for Extended Alphabets" Data Compression Conference, (1993), 11 pages.
Antoshenkov "Dictionary-Based Order-Preserving String Compression" The International Journal on Very Large Data Bases, vol. 6, Issue 1, (Feb. 1997), 14 pages.
Graefe et al. "Data Compression and Database Performance" Proceedings of the ACM/IEEE-CS Symposium on Applied Computing, (1991), 10 pages.
Copeland et al. "A Decomposition Storage Model" Proceedings of the 1985 ACM SIGMOD International Conference on Management of Data, (1985), 12 pages.
Padmanabhan et al. "Multi-Dimensional Clustering: A New Data Layout Scheme in DB2" Proceedings of the 2003 ACM SIGMOD International Conference on Management of Data, (2003), 5 pages.
Dai et al. "Geometry-Adaptive Block Partitioning for Intra Prediction in Image and Video Coding" IEEE International Conference on Image Processing, (2007), 4 pages.

* cited by examiner

INTRA-BLOCK PARTITIONING FOR DATABASE MANAGEMENT

CROSS-REFERENCE TO RELATED APPLICATIONS

This application is a continuation of U.S. application Ser. No. 13/485,707, filed on May 31, 2012, which is incorporated by reference herein in its entirety.

BACKGROUND

Data compression has become an important feature for high-performance data warehouses. Many database management systems (DBMSs) support storing data in compressed form to reduce storage and input/output needs. To be efficient for processors and caches, many DBMSs also operate directly on compressed values. The DBMSs use some form of dictionary or prefix encoding so that algorithms for predicate evaluation, join, etc., directly apply on encoded values.

Several issues may arise when using compressed databases, particularly when handling new values or wide-sparse tables. Processing data is faster when handling fixed length and fixed format data. When handling new values, DBMSs may require support for heterogeneous representations for values that may be unencoded or encoded differently. When handling wide-sparse tables that have a lot of attributes where only a small number of one or more attributes are non-null values in any given record, representing the null values according to a DBMS's particular encoding configuration can have a negative impact on query performance.

SUMMARY

Embodiments of a method are described. In one embodiment, the method is a method for storing database information, including: storing a table having data values in a column major order, wherein the data values are stored in a list of blocks, assigning a tuple sequence number (TSN) to each data value in each column of the table according to a sequence order in the table, wherein data values that correspond to each other across a plurality of columns of the table have equivalent TSNs; assigning each data value to a partition based on a representation of the data value; and assigning a tuple map value to each data value, wherein the tuple map value identifies the partition in which each data value is located. Other embodiments of the method are also described.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for storing database information. More specifically, the system uses intra-block partitioning (IBP) to store data in a table by assigning values within blocks for each column and representing the data values with long runs of fixed length values for efficient processing. The IBP uses stable partitioning, such that within each partition, values are in the same order as the global tuple ordering, which is the same for all columns in the table.

Various conventional systems handle the storage of new values on a database using different methods. For example, if an initial load of data values for the database finds only 240 distinct values, and uses an 8-bit code to encode the data values, the 8-bit code can represent up to 256 data values ($2^8$). If 17 new values (resulting in a total of 257 data values) are inserted, the 8-bit code is not sufficient for representing all of the data values. Any solutions may need to support heterogeneous representations for the specific column in which many values are encoded, but some are unencoded or encoded differently.

One solution horizontally partitions the table and includes an exception region where non-encodeable values are placed (typically, values are stored unencoded in the exception region, but problems may exist irrespective of the representation of the new data values. While this solution may be sufficient for tables with a small number of attributes, the size of the exception region increases exponentially with the number of attributes. E.g., in a 100-attribute table, if each attribute can be unencodeable with 1% independent probability, 64% of the records fall into the exception region (1-0.99^100).

Another form of horizontal partitioning includes periodically switching to a new dictionary that is used for subsequently inserted records. Performance for this solution may also suffer for tables with many attributes because the increased number of attributes requires that the system switch to the new dictionary at frequent intervals.

Other systems use a variable length representation, where for a given column, each tuple in the column can have a different length depending on the encoding scheme for the column value in that tuple. This scheme can be expensive when operating queries because parsing variable length entries introduces conditional branches and precludes pipelined and single instruction, multiple data (SIIVID) parallelism.

A related problem that occurs is when handling wide-sparse tables that have many attributes but only a small number of non-null values in any given record. This is increasingly common in many databases due to loosely structured schemas. Encoding null values with large codes (typically 1-byte or more) takes up an unnecessary amount of space. For example, for a date column that is null 95% of the time, the null value would ideally be represented with a very small code. However, database management systems that are configured to encode null values the same as non-null values represent the null values with unnecessarily large codes. Otherwise, a fixed-length column is turned into a variable-length column, which has a negative impact on query performance.

Consequently, a system and method that allows heterogeneous representations for column values and allows null values to be represented with a code length appropriate to the frequency of the null values without introducing many of the disadvantages of the previously described solutions may allow for increased flexibility in dealing with new values and multiple encoded partitions with different code lengths.

Figure 1:
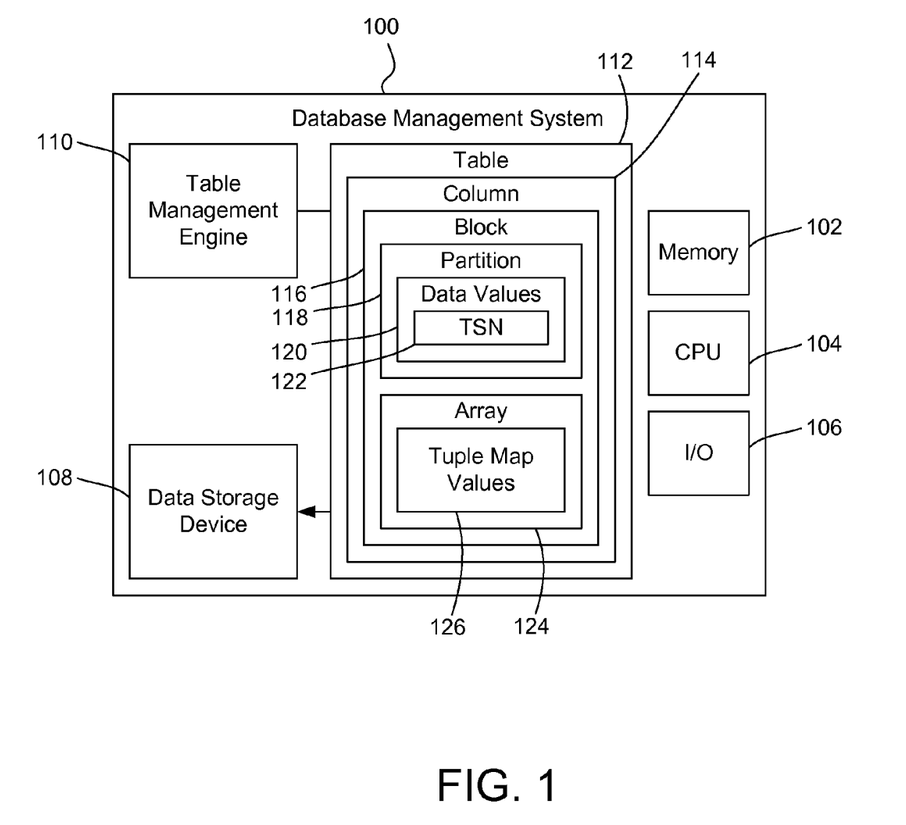
FIG. 1 depicts a schematic diagram of one embodiment of a database management system.
Figure 4:
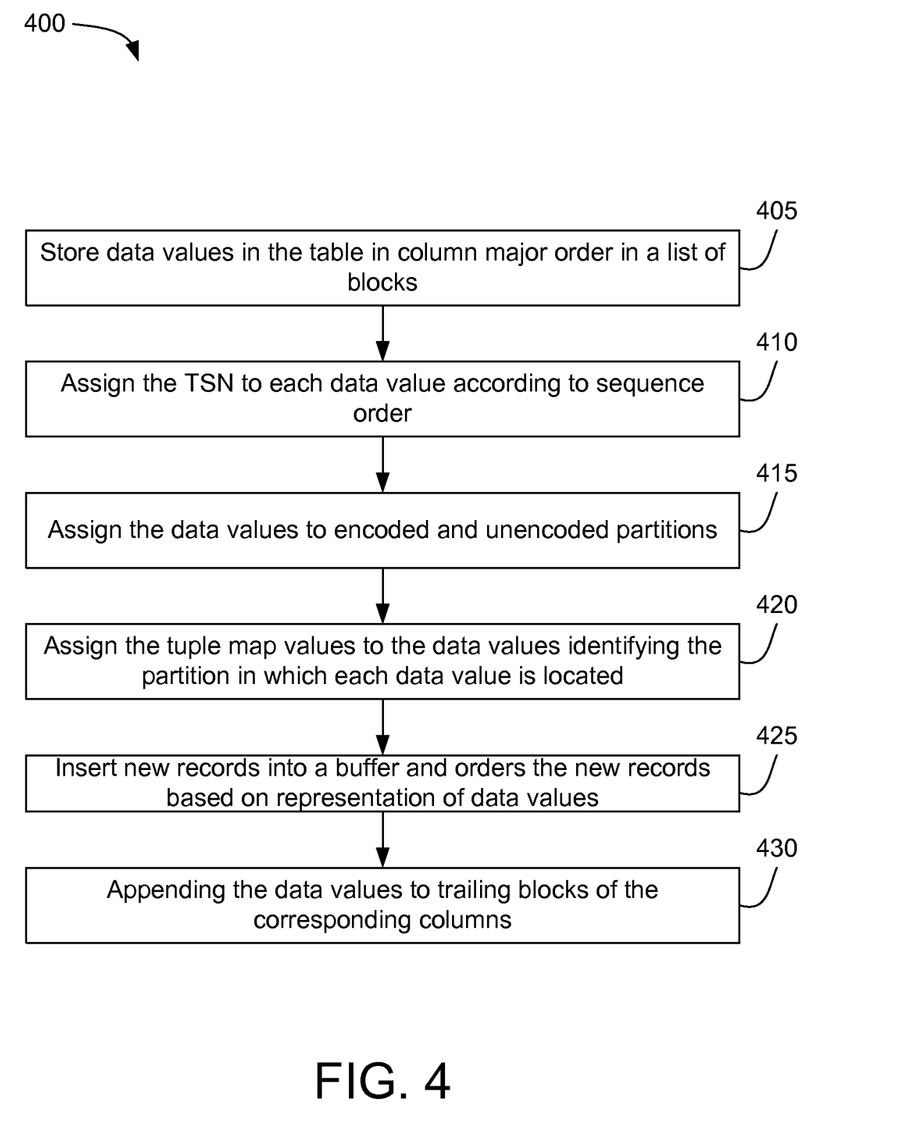
FIG. 4 depicts a flowchart diagram of one embodiment of a method for storing database information.

FIG. 1 depicts a schematic diagram of one embodiment of a database management system (DBMS) 100. The depicted DBMS 100 includes various components, described in more detail below, that are capable of performing the functions and operations described herein. In one embodiment, at least some of the components of the DBMS 100 are implemented in a computer system. For example, the functionality of one or more components of the DBMS 100 may be implemented by computer program instructions stored on a computer memory device 102 and executed by a processing device 104 such as a CPU. The DBMS 100 may include other components, such as input/output devices 106, a data storage device 108, and a table management engine 110. Some or all of the components of the DBMS 100 may be stored on a single computing device or on a network of computing devices, including a wireless communication network. The DBMS 100 may include more or fewer components or subsystems than those depicted herein. In some embodiments, the DBMS 100 may be used to implement the methods described herein as depicted in FIG. 4.

In one embodiment, the table management engine 110 manages data in a table 112 that is stored on the data storage device 108. In some embodiments, the DBMS 100 may include more than one data storage device 108 for holding one or more tables 112. One or more data storage devices 108 may be located on one or more computing device or across a network of computing devices and may share table data across one or more of the computing devices.

In one embodiment, the table 112 is stored on the data storage device 108 in column major order in a list of blocks 116 for each column 114 in the table 112. Storing the data in column major or column group major order may allow query processes on the database to operate more efficiently because the system accesses only the columns 114 specified in the query rather than all of the columns 114 in the table 112.

In one embodiment, each column 114 within the table 112 is divided into one or more blocks 116 based on the number of data values 120 stored in the column 114. Each block 116 may contain up to a predetermined number of data values 120. Each data value 120 in a given column 114 may be assigned a tuple sequence number (TSN) 122. The TSN 122 may be assigned according to a sequence order in the table 112, which may also correspond to the order in which the data values 120 were inserted into the column 114. TSNs 122 may be specific to each column 114, such that data values 120 that occupy the same position in different columns 114 may have the same TSN 122. Data values 120 in different columns 114 that occupy the same position in the different columns 114 may be linked using a common TSN 122.

Each block 116 in each column 114 may be divided into partitions 118. The partitions 118 are created and stored in a stable way that respects the original tuple order of the block 116 and within each partition 118. This allows the system to maintain an array 124 that is based on the number of partitions 118. The partitions 118 created by the table management engine 110 are determined by the types of representations of the data values 120 in the block 116. For example, if the block 116 includes data values 120 that are encoded to a certain number of bits and data values 120 that are unencoded, the table management engine 110 may divide the block 116 into two partitions 118. The first partition 118 may include the encoded data values 120 and the second partition 118 may include the unencoded data values 120. In some embodiments, the block 116 may include data values 120 that all share a single representation method, such that the block 116 includes only a single partition 118. Structuring the compressed table 112 to include the least possible number of partitions 118 per block 116 according to data value 120 representations may improve query processing and other processes performed on the database.

In one embodiment, the representation within each partition 118 follows a dictionary coding scheme, though other embodiments may follow other fixed-length coding schemes, such as run-length encoding or variable length encoding in which unencoded values may be represented in a variable-length format. The representation may use more than one encoding scheme for different data values 120 within the same column 114.

In wide tables 112 with a large number of sparse columns 114, the null values may be separated into partitions 118 that are encoded with fewer bits than other, less frequent data values 120. In some embodiments, the null values take up zero bits within the partition 118 and the only space requirement is for the tuple map values 126 in the array 124, which identify the corresponding partition 118 and allow the DBMS 100 to restore the TSN order for a query.

Figure 3:
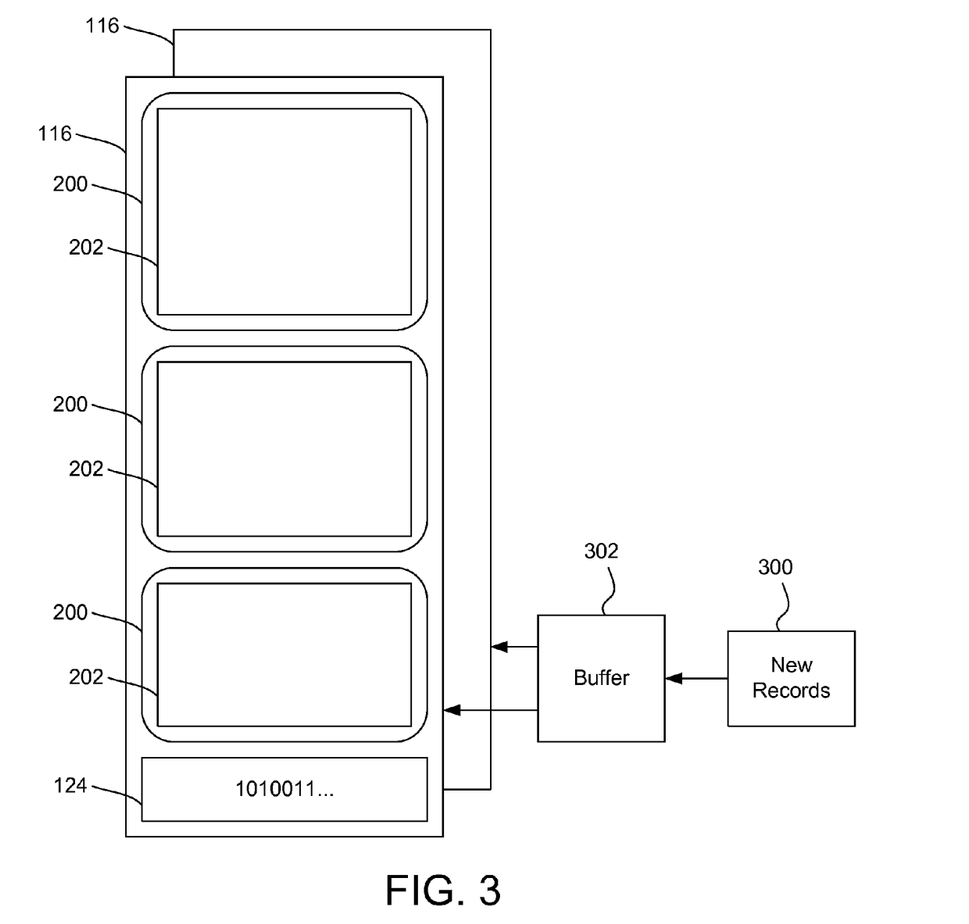
FIG. 3 depicts a schematic diagram of one embodiment of a column block.

In some embodiments, new records 300, as shown in FIG. 3, may be added to the table 112 that includes the block 116 by inserting the corresponding data values 120 into a trailing block 116 in each column 114. The system may determine which representations apply to the data values 120 in the new records 300 and append the data values 120 to the corresponding partitions 118. In some embodiments, the new records 300 are temporarily stored in a buffer until a certain number of new records 300 have been stored in the buffer or until a buffer time threshold is reached, and then the new records 300 are inserted into the table 112 collectively.

The system assigns a tuple map value 126 to each data value 120 in the block 116 and stores the tuple map value 126 in an array 124. The tuple map value 126 identifies the partition 118 in which each data value 120 is located. The size of the tuple map value 126 is based on the number of partitions 118 used in the given block 116. A block 116 that has only two partitions 118, for example, may have an array 124 with single bit values to indicate the partitions 118.

Figure 2:
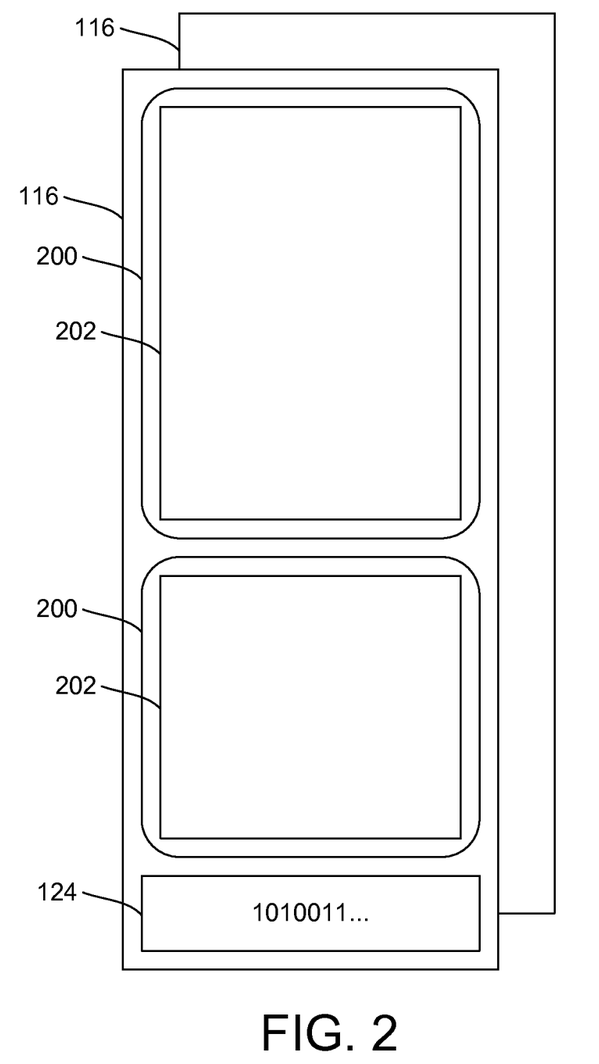
FIG. 2 depicts a schematic diagram of one embodiment of a column block.

FIG. 2 depicts a schematic diagram of one embodiment of a column block 116. Although the database management system 100 is described herein in conjunction with the column block 116 of FIG. 2, the database management system 100 may be used in conjunction with any column block 116.

In one embodiment, the column block 116 contains all data values 120 corresponding to data values 120 within a range of TSNs 122 (refer to FIG. 1). The TSNs 122 identify the order of insertion of the data values 120 in the column 114. The data blocks 116 in each column 114 may have a maximum number of data values 120 according to a predetermined block size. The predetermined block size may be a fixed length determined according to the capabilities or configuration of the DBMS 100. If a column 114 has fewer data values 120 than the predetermined block size, the column 114 may include only one block 116. If the block 116 has more data values 120 than the predetermined block size, the column 114 may include more than one block 116.

The blocks 116 for a given column 114 may be maintained in TSN order according to the TSN ranges corresponding to each column 114. Within the blocks 116, the data values 120 may not be stored in TSN order, though queries or other processes performed on the table 112 may retrieve and display the data values 120 in TSN order. The data values 120 are separated into partitions 118 within the corresponding blocks 116. The partitions 118 (refer to FIG. 1) may be contained in or correspond to separate regions 200, which are contiguous portions of a block 116. Each region 200 may include a bank 202, which may contain encoded or unencoded values. The bank 202 may be a unit for scanning the data values 120 when running a process to access the data values 120 in a given block 116. While the blocks 116 are described herein to include regions 200 and banks 202 within the regions 200, the blocks 116 may be structured in other ways for other embodiments.

In one embodiment, each region 200 contains one partition 118 of the column 114. Data values 120 may be stored in the different partitions 118 based on the way each data value 120 may be represented in the database table 112. In one embodiment, each partition 118 includes a set of values from a column 114 (refer to FIG. 11 having similar frequencies and identical-length encodings. For example, a data value 120 that is represented as an uncompressed value is stored in a partition 118 with other data values 120 that are represented as uncompressed values. In another example, data values 120 that are represented as a compressed value with a given number of bits are stored in a partition 118 with other data values 120 represented as a compressed value with the same number of bits. In one embodiment, the partitions 118 are used in the DBMS 100 compression scheme to improve performance of database queries and other database processes.

The block 116 also includes an array 124 in which the tuple values are stored that index the data values 120 to the corresponding regions 200 (or partitions 118, described in FIG. 1, contained in the separate regions 200). The number of bits in the tuple values may depend on the number of partitions 118 in the block 116. For a block 116 that includes two partitions 118, for example, the partitions 118 may be represented using a single bit—a one or a zero. For blocks 116 that include more than two partitions 118, the partitions 118 may be represented by more than one bit in the array 124. The array 124 may help the DBMS 100 in retrieving the data values 120 in TSN order when a query process or other process requests the data values 120.

FIG. 3 depicts a schematic diagram of one embodiment of a column block 116. Although the database management system 100 is described herein in conjunction with the column block 116 of FIG. 3, the database management system 100 may be used in conjunction with any column block 116.

In various embodiments, each block 116 in a given column 114 may include different partitions 118 (or regions 200) and different numbers of partitions 118 (or regions 200) than other blocks 116. For example, a first block 116 may contain two partitions 118 corresponding to data values 120 that are either uncompressed or compressed to a 10-bit code. A second block 116 may include three partitions 118 corresponding to data values 120 that are uncompressed, compressed to a 10-bit code, and data values 120 that are compressed to a 4-bit code. Each block 116 may have more or fewer partitions 118, and the partitions 118 in each block 116 may store data values 120 compressed to codes containing more or fewer bits than described in the above embodiment.

In one embodiment, new records 300 to be inserted into a table 112 are assigned TSNs 122 according to an insert order. The TSN 122 assigned to the data values 120 in a single record allow the DBMS 100 to identify each of the data values 120 with the corresponding new record 300. In one embodiment, the TSN 122 is the same for each of the data values 120 in a single record. Each data value 120 of the inserted record may be inserted into the trailing block 116 of the corresponding column 114. An insert program (or loader) may represent the data values 120 using the smallest representation that can hold that value (choosing an unencoded representation in the worst case). The chosen representation determines which partition 118 within the corresponding block 116 holds the data values 120. The insert program accordingly assigns the tuple map value 126 with the corresponding partition 118 to the array 124 and inserts the data value 120 to the chosen partition 118.

In one embodiment, the DBMS 100 may store many tuples (lists of data values 120) in a buffer 302 and reorder tuples within the buffer 302 according to the partition 118 in which the data values 120 are assigned to preserve a TSN order of the records among values having identical representation. If a sufficiently large buffer 302 is used, the DBMS 100 may filter the new records 300 entered into the buffer 302 to produce blocks 116 that contain a single partition 118 using data values 120 that may all use the same representation, leading to further efficiencies in query processing.

FIG. 4 depicts a flowchart diagram of one embodiment of a method 400 for storing database information. While the method 400 is described in conjunction with the database management system 100 of FIG. 1, embodiments of the method 400 may be implemented with other types of database management systems 100.

In one embodiment, the DBMS 100 stores 405 data values 120 in the table 112 having data values 120 in column major order. The data values 120 may be stored in a list of blocks 116. Each data value 120 in each column 114 of the table 112 is assigned 410 a TSN 122 according to a sequence or tuple order of the table 112. Data values 120 that correspond to each other across a plurality of columns 114 of the table 112 have equivalent TSNs 122 so that the DBMS 100 is able to stitch or recombine the data values 120 back together when retrieving the data values 120 for a query or other process.

The DBMS 100 then assigns 415 the data values 120 to partitions 118 based on a representation or encoding format of each data value 120. In one embodiment, the DBMS 100 assigns the data values 120 to a first partition 118 and a second partition 118. The first partition 118 may include data values 120 encoded to a first encoding format and the second partition 118 may include unencoded data values 120. In another embodiment, the DBMS 100 assigns the data values 120 into a third partition 118 which includes data values 120 encoded to a second encoding format. The DMBS 100 may assign each data value 120 to one of any number of partitions based on the encoding format of each data value 120, in various embodiments.

The DBMS 100 also assigns 420 a tuple map value 126 to each data value 120 in a block 116. The tuple map value 126 is stored in an array 124 and identifies the partition 118 in which each data value 120 is located. Thus, the length of the tuple map value 126 may be determined by the number of partitions 118 in the block 116. The tuple map values 126 in a block 116 having two or fewer partitions 118 may have a length of one bit per data value 120. The tuple map values 126 in a block 116 having more than two partitions 118 may have a length of more than one bit per data value 120. For example, an array 124 for a block 116 containing three partitions 118 may include tuple map values 126 of at least two bits to represent all of the partitions 118.

In one embodiment, the DBMS 100 receives new records 300 including related data values 120 for insertion into the columns 114 in the table 112 and first inserts 425 the new records 300 into a buffer 302. The buffer 302 may be a temporary storage medium in which a predetermined number of records or data values 120 may be stored. The DBMS 100 orders the records within the buffer 302 based on a representation of the data values 120 in each record and preserve a TSN order of the records among values having identical representation. The records from the buffer 302 may then be appended 430 to partitions 118 in a trailing block 116 of each corresponding column 114. The data values 120 have a TSN 122 corresponding to the sequence order in the table 112. The DBMS 100 also assigns a new tuple map value 126 to each data value 120 of the records for the corresponding partitions 118 to which the data values 120 are appended. In some embodiments, buffering the new records 300 before appending the data values 120 to the columns 114 may lead to additional efficiencies in query processing. The new records 300 may be inserted into the table 112 in response to any threshold reached by the buffer 302, including a time threshold or a threshold based on the number of tuples of data values 120 in the buffer 302.

Figure 5:
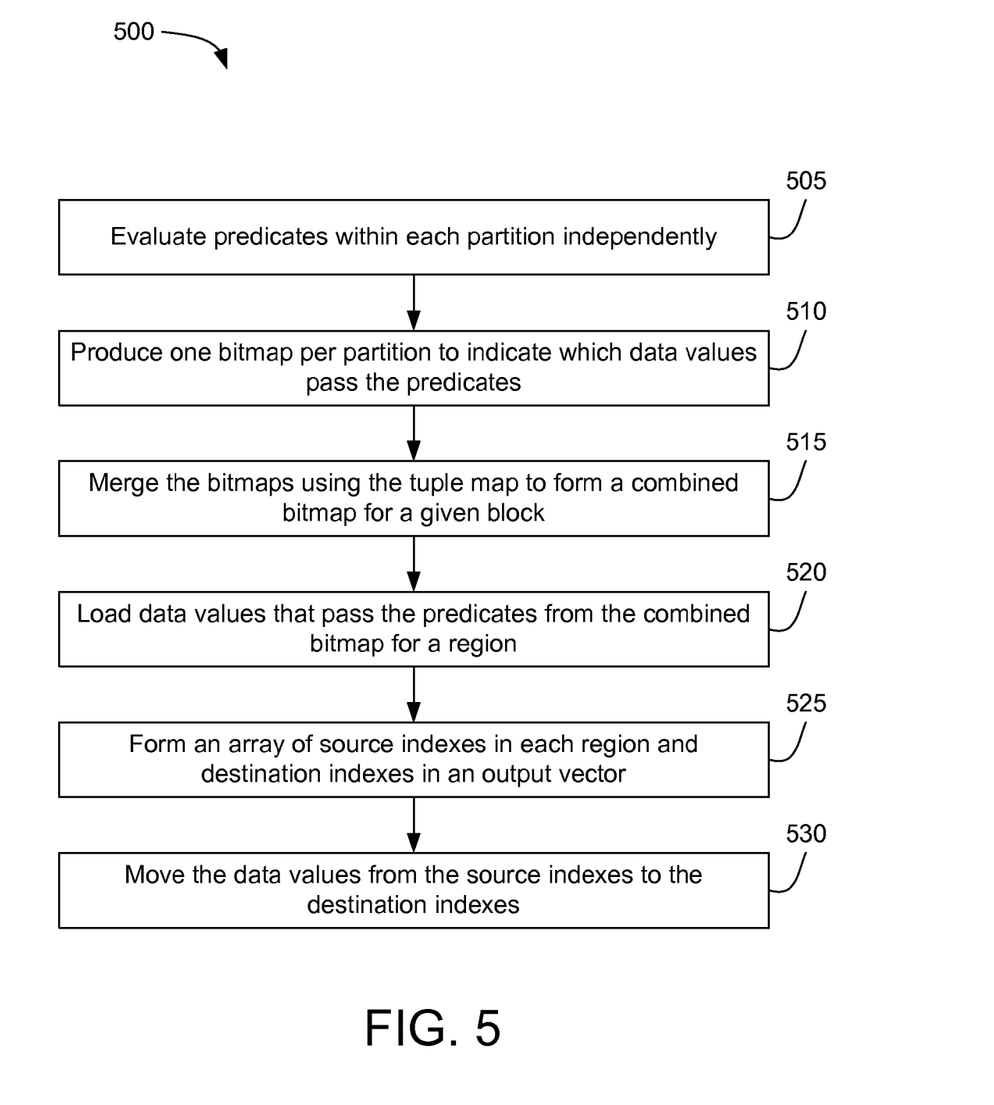
FIG. 5 depicts a flowchart diagram of one embodiment of a method for accessing stored database information.

FIG. 5 depicts a flowchart diagram of one embodiment of a method 500 for accessing stored database information. While the method 500 is described in conjunction with the database management system 100 of FIG. 1, embodiments of the method 500 may be implemented with other types of database management systems 100.

In one embodiment, the DBMS 100 evaluates 505 predicates, for example to apply query rules that perform operations on a subset of the table 112, within each partition 118 of a given column 114 independently. The DBMS 100 produces 510 one bitmap per partition 118 that indicates which data values 120 pass the corresponding predicates evaluated by the DBMS 100. The DBMS 100 may then merge 515 all bitmaps for a block 116 using the array 124 to form a combined bitmap for the block 116. This combined bitmap may be used to stitch columns 114 in the table 112 together for query processes on the compressed data because the combined bitmap is in TSN order. The bitmaps may be merged using multiplication with the array 124 for bitvector expansion.

In one embodiment, after evaluating the predicates, the DBMS 100 loads 520 the data values 120 that pass the predicates from the combined bitmap for one region 200 at a time or separately and loads values or global codes only for the valid TSNs 122. The region 200 includes one partition 118 in the corresponding block 116. The DBMS 100 forms 525 an array of source indexes in each region 200 and destination indexes in an output vector.

In one embodiment, the DBMS 100 produces a bitmap of tuples in each partition 118 and a bitmap of tuples that pass all previous predicates. The DBMS 100 then loads only tuples in the intersection of the two bitmaps. The data values 120 that pass the predicates are then moved 530 from the source indexes to the destination indexes. In one embodiment, the source indexes are converted into banklet indexes and tuplet indexes in a bank.

In one embodiment, the DBMS 100 performs sequential scanning on the array 124. The DBMS 100 maintains a cursor in each partition 118 in the array 124 and accesses a given data value 120 from the cursor on an indicated partition 118 in response to encountering the indicated partition 118 while scanning the array 124. The DBMS 100 increments the cursor. Other embodiments of sequential scanning and random scanning of the table 112 may be used with the DBMS 100.

An embodiment of a database management system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to store database information.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for storing database information, comprising:
storing a table comprising data values in a column major order, wherein the data values comprise encoded and unencoded data values, wherein the data values within each column are stored in a list of blocks, wherein each block comprises an array;
assigning a tuple sequence number (TSN) to each data value in each column of the table according to a sequence order in the table, wherein data values that correspond to each other across a plurality of columns of the table have equivalent TSNs;
identifying a bit length of each encoded data value and an encoding representation of each encoded data value;
assigning each encoded data value in a block to one of a plurality of partitions within the block based on the bit length of each encoded data value and the encoding representation of each encoded data value, and assigning the unencoded data values to a separate partition from the encoded data values, the unencoded data values stored in an unencoded format and each other partition comprising data values stored in a distinct encoding format, representing each partition in the array within the block, wherein the array is an index separate from the plurality of partitions;
indexing the data values in the block in an array contained in the block by assigning a tuple map value to each data value, wherein the tuple map value identifies the partition in which each data value is located; and
storing the tuple map values in the array within the block.

2. The method of claim 1, further comprising:
receiving a new record comprising related data values for insertion into the plurality of columns in the table;
inserting the new record into a buffer;
ordering records within the buffer based on the representation of the data values in each record to preserve a TSN order of the records among values comprising identical representation;
appending the data values of the records from the buffer to partitions in a trailing block of each corresponding column; and
assigning a new tuple map value to each data value of the records for the corresponding partitions.

3. The method of claim 1, further comprising:
receiving a query that performs operations on a subset of the table identified by one or more predicates;
evaluating the predicates within each partition independently;
producing one bitmap per partition, wherein each bitmap indicates only data values which pass the corresponding predicates; and
merging all bitmaps using the tuple map values to form a combined bitmap for the corresponding block.

4. The method of claim 3, further comprising:
loading the data values that pass the predicates from the combined bitmap for a region, wherein the region comprises one partition in the corresponding block;
forming an array of source indexes in each region and destinations indexes in an output vector; and
moving the data values from a first location specified by the source indexes to a second location specified by the destination indexes.

5. The method of claim 1, further comprising:
sequentially scanning a tuple map comprising the tuple map values;
maintaining a cursor in each partition in the tuple map; and
accessing a given data value from the cursor on an indicated partition in response to encountering the indicated partition while scanning the tuple map; and
incrementing the cursor.

* * * * *